No. 764,432. PATENTED JULY 5, 1904.
B. DE MOCKER.
ANIMAL TRAP.
APPLICATION FILED MAR. 4, 1904.

NO MODEL.

Witnesses
Geo. Ackman Jr.
Katharine Allen.

Inventor
Bert De Mocker;
By Victor J. Evans
Attorney

No. 764,432.  
Patented July 5, 1904.

UNITED STATES PATENT OFFICE.

BERT DE MOCKER, OF NUNDA, NEW YORK.

ANIMAL-TRAP.

SPECIFICATION forming part of Letters Patent No. 764,432, dated July 5, 1904.

Application filed March 4, 1904. Serial No. 196,518. (No model.)

*To all whom it may concern:*

Be it known that I, BERT DE MOCKER, a citizen of the United States, residing at Nunda, in the county of Livingston and State of New York, have invented new and useful Improvements in Animal-Traps, of which the following is a specification.

This invention relates to animal-traps, the object of the invention being to provide a novel form of spring-trap, or, in other words, a trap embodying spring-actuated jaws which are so constructed as to grasp the leg of an animal and hold the same securely without liability of breaking or mashing the bone so as to partially sever the leg and enable the animal to thereby escape by leaving the caught portion of the leg in the trap.

A further object of the invention is to provide a novel form of tripping device which does away with a hinge, and which is therefore not liable to get out of order by reason of the presence of rust or the accumulation of other matter around and about the joint of the trap.

A further object of the invention is to so construct and mount the jaws with relation to their actuating-spring that when the trap is set the accidental tilting or flopping over of either of the jaws is overcome.

With the above and other objects in view the invention consists in the novel construction, combination, and arrangement of parts, as herein fully illustrated, described, and claimed.

Figure 1:
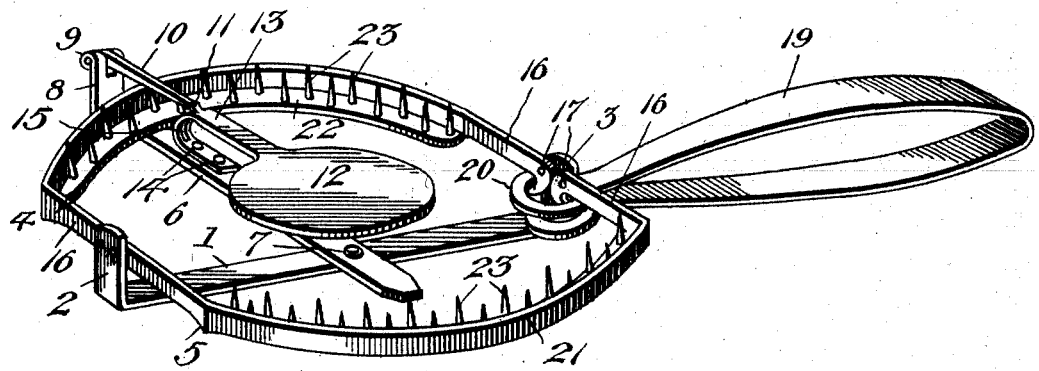
Figure 2:
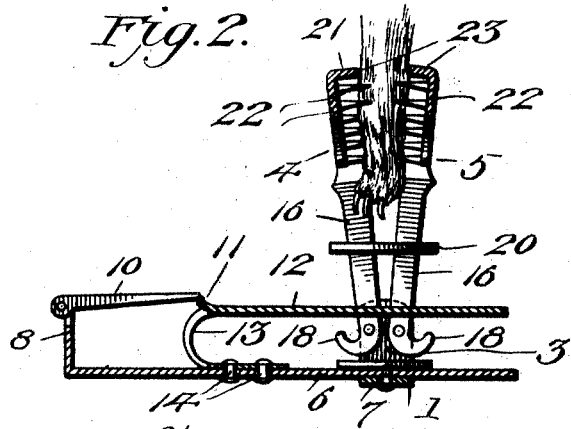
Figure 3:
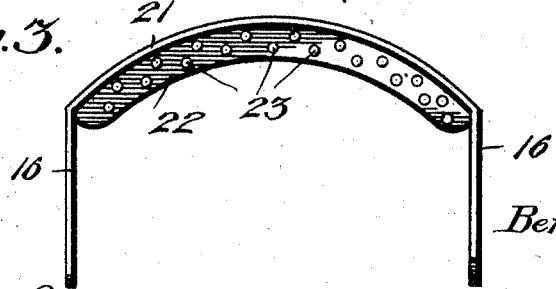

In the accompanying drawings, Figure 1 is a perspective view of an animal-trap embodying the present invention. Fig. 2 is a vertical sectional view of the same. Fig. 3 is a side elevation of one of the jaws.

Like reference-numerals designate corresponding parts in all the figures of the drawings.

The frame of the trap consists, preferably, of a metal bar 1, having the opposite ends thereof upturned, as shown at 2 and 3, to form short posts or uprights, to which the jaws 4 and 5 are pivotally connected. The frame also comprises another bar or strap 6, which is rigidly connected to the bar 1 at the point 7, where they cross. The outer end of the bar 7 is upturned, as shown at 8, and provided with a knuckle 9, in which is pivotally mounted a catch or detent 10, which extends across the jaw 4 when the latter is set, while the free end of the catch engages a lip or shoulder 11, extending backward from a disk-shaped pan or plate 12. The pan or plate 12 is provided with a curved or U-shaped spring-shank 13, the end of which is firmly secured at 14 to the bar 6, as shown in Figs. 1 and 2. The curved portion of the shank is also slotted, as shown at 15, so as to provide for the formation of the lip or shoulder 11 and so as to weaken the shank and give greater resiliency thereto, so that the pan 12 may be easily depressed by the weight of the animal to throw the lip or shoulder 11 out of engagement with the catch 10, whereupon the latter will swing upward and outward and release the adjacent jaw 4. The jaws are provided with inwardly-extending side arms 16, which are pivotally connected at 17 to the posts 2 and 3, and the inner ends of said arms are provided with reversely-disposed hooks 17$^a$, which form stops for preventing the spring hereinafter described from getting under the ends of the arms 16 and interfering with the working of the jaws. The actuating-spring 19 is of the usual elliptical form, having one end secured to the post 3 of the trap, and each end is provided with a ring or annulus 20, which embraces the post 3 and exerts an upward pressure on the arms 16, as clearly shown in Fig. 1. When the jaws are set, the hooks 18 extend under the ring 20, the latter thus acting to prevent either one of the jaws from accidentally swinging or turning over, a defect which is present in the usual animal-trap of the type herein described. Each of the jaws consists of a curved rim 21, and is provided in addition thereto with an inwardly-extending segmental flange 22, having a multiplicity of spiked teeth 23 projecting inwardly therefrom, as shown in Fig. 2, the said teeth being longer than the width of the rim 21, so as to enter the animal's leg and impale the same in the manner indicated in Fig. 2. In Fig. 3 it will be observed that the teeth 23 are arranged in staggered form, said arrangement being found the most effective in practice.

From the foregoing description it will be seen that by doing away with the usual pivot-joint, by which the pan 12 is ordinarily connected to the frame of the trap, and by providing said pan with a spring-shank in lieu thereof there is no pivot-joint to become rusty and render the trap inoperative. It will also be observed that the animal's leg is caught and held without danger of crushing or breaking the bone, this result being obtained by providing the flanges 22 with inwardly-facing spikes or teeth 23, which impale the leg. Furthermore, both jaws are held set by reason of the coöperation between the spring and the hooked extremities of the arms of the jaws.

Changes in the form, proportion, and minor details of construction may be resorted to without departing from the principle or sacrificing any of the advantages of the invention.

Having thus described the invention, what I claim as new is—

1. An animal-trap comprising a frame, spring-actuated jaws pivotally connected therewith, a pivoted catch for holding one of the jaws, and a tripping device consisting of a pan having a spring-shank secured to the frame and adapted to engage and hold the catch, substantially as described.

2. An animal-trap comprising a frame, spring-actuated jaws pivotally connected thereto, a catch for holding one of the jaws, and a tripping device consisting of a pan having a spring-shank provided with a slot and a laterally-extending lip or shoulder which engages and releases the catch, substantially as described.

3. An animal-trap comprising a frame, spring-actuated jaws pivotally connected thereto, a pivoted catch adapted to hold one of the jaws, and a tripping device consisting of a pan provided with a recurved spring-shank, said shank having a lip or shoulder which coöperates with the pivoted catch.

4. An animal-trap having a frame, spring-actuated jaws pivotally connected thereto, and tripping mechanism for holding and releasing the jaws, each jaw embodying an outer rim or flange continuing into side arms, an inwardly-extending segmental flange substantially at right angles to the rim, and spikes extending at right angles from the segmental flange close to the rim and of greater length than the width of the rim.

5. An animal-trap having a frame, posts rising therefrom, spring-actuated jaws pivotally connected thereto, and having side arms terminating in reversely-directed hooks located below the pivot-points for the arms, the said hooks being continuous with the arms and disposed in planes parallel with the inner side of the one post, and a spring for actuating the jaws, said spring comprising a terminal ring movable over the side arms and arranged to engage the hooks at opposite sides of the center thereof.

In testimony whereof I affix my signature in presence of two witnesses.

BERT DE MOCKER.

Witnesses:
HERBERT D. LAWSON,
GEORGE M. BOND.